2,975,152

ESTERS OF PENTAERYTHRITOLS AND VINYL CHLORIDE RESIN COMPOSITION PLASTICIZED THEREWITH

Marvin J. Hurwitz, Elkins Park, Andrew M. Craig, Jr., Philadelphia, and Ellington M. Beavers, Elkins Park, Pa., assignors to Rohm & Haas Company, Philadelphia, Pa., a corporation of Delaware No Drawing. Filed Apr. 9, 1957, Ser. No. 651,590

20 Claims. (Cl. 260—31.6)

This invention deals with a new class of esters of pentaerythritol and/or polypentaerythritols and with vinyl chloride compositions plasticized therewith. More particularly, this invention concerns a special class of plasticizers which are esters of pentaerythritol and of polypentaerythritols having an average number of esterifiable hydroxyl groups not exceeding eight, these plasticizing esters having a melting point of not over 35° C. and having acid residues generally containing an average number of carbon atoms of 5 to 7 inclusive, and also an H. Number defined further below of 8 to 16.5. This invention also concerns the polyvinyl chloride compositions plasticized with these esters and having unexpected and exceptional electrical properties combined with highly satisfactory general qualities.

Plasticized vinyl chloride polymers have numerous important applications in the electrical field. Such uses include electrical insulators and sheathing of power cables, tool wiring, base plugs, jacketing, and a great variety of other electrical industrial equipment. Particularly as electrical insulators, the plasticized vinyl polymeric materials are subjected to high temperatures with or without concurrent high moisture conditions. Plasticizers commonly required to reduce the internal viscosity of vinyl resins and to impart the requisite amount of flexibility. However, particularly under wet or high moisture conditions, they markedly increase the dielectric loss over a wide range of temperatures.

The importance of the economic and safety problems involved has induced numerous attempts to find a satisfactory plasticizer for polyvinyl resins for use in electrical applications. Some monobasic acid esters of pentaerythritols and polypentaerythritol are known and a few have been suggested as plasticizers for vinyl resins and/or for cellulose derivatives. These conventional esters are made with short-chain, long-chain, or mixtures of short and long chain acid residues. Some of the esters are aromatic esters, others are mixtures of aromatic and aliphatic acids. Most of these conventional esters are not adequate as plasticizers in polyvinyl compositions for use in electrical applications. Those few which may be used as plasticizers soon show a progressive loss in electrical resistance.

Limited improvements of the electrical properties of thermoplastics have been attempted with pentaerythritol mixed esters having acid residues of various lengths and particularly with acids differing one from the other by at least 3 carbon atoms. Again, such plasticized materials, such as for instance polyvinyl chloride plasticized with pentaerythritol triacetate butyrate, fail to reach the standards required of vinyl resins used in electrical compositions. Recently an attempt has been made to employ as plasticizers such mixed esters of pentaerythritol as typified by pentaerythritol dibutyrate dicaprylate. Such plasticizers again are quite inadequate in many respects.

In view of these facts, there is an urgent need for a plasticizer for vinyl resins which combines good permanence, stability, and good mechanical properties, while maintaining in the composition a high level of insulation resistance at elevated temperatures and/or at high level of humidity.

The special group of plasticizers which we have discovered combines the requisite high level of mechanical properties with unequalled dielectric strength at room temperature and at elevated temperatures under dry or wet conditions, and after prolonged immersion in water at elevated temperatures. Moreover, these new plasticized polyvinyl halide compositions unexpectedly possess other qualities valuable in electrical applications such as superior resistance to hydrolysis, to fungi attack, and to copper corrosion.

The new plasticizers which we have discovered owe their distinctive qualities to a particular combination of characteristics which are fully discussed in the section below.

The plasticizers are a special group of esters of pentaerythritol, lower polypentaerythritols such as dipentaerythritol, tripentaerythritol, higher polypentaerythritols, and mixtures thereof. Polypentaerythritol esters are those esters which are higher derivatives of pentaerythritol and which are formed by etherification of one or more hydroxyl groups of pentaerythritol with other pentaerythritol residues. Polypentaerythritols include dipentaerythritol, tripentaerythritol, tetrapentaerythritol, pentapentaerythritol, heptapentaerythritol, octapentaerythritol, nonapentaerythritol, decapentaerythritol, similar higher pentaerythritols, and mixtures thereof. Polypentaerythritol esters are esterification products of the above polypentaerythritols. Pentaerythritols and polypentaerythritols which are esterified with at least one of the particular acids defined below may be represented by the following Formula I

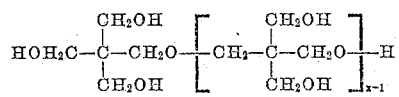

where $x$ equals 1 to 14 with ($a$) a special situation where $x$ equals from 1 to 3 and ($b$) the cases where $x$ equals from 1 to above 3 but in a mixture in which the average value of $x$ is not over 3. Since averages are dealt with, the value of $x-1$ may be a fraction or a mixed number as well as an integral number.

The preparation of various polypentaerythritols which are used herein is known. Such illustrative methods are found in U. S. Patent Nos. 2,462,049 and 2,552,532 and in British Patent Nos. 757,564 and 615,370. Pentaerythritols and various polypentaerythritols such as dipentaerythritol and tripentaerythritol also are known and commercially available. So are mixtures of various lower pentaerythritols such as pentaerythritol with dipentaerythritol and/or tripentaerythritol or mixtures of the latter two. In this invention, these polyols are used singly or, often because of their commercial availability, in mixtures containing various amounts of at least two such polyols such as pentaerythritol, dipentaerythritol, and tripentaerythritol. There are also used herein available mixtures of polypentaerythritols containing higher polypentaerythritols mixed with pentaerythritol and with lower polypentaerythritols. For instance, "Polypentek" Heyden Chemical Corporation is stated to be a mixed polypentaerythritol containing pentaerythritol and higher etherification derivatives thereof, and averaging out to tripentaerythritol.

In accordance with this invention it is a particular class of esters of these pentaerythritols and polypentaerythritols which endows vinyl halide polymers with unexpectedly superior electrical properties. The esterifying acids which are used belong to a special class characterized by features discussed below.

The first requirement of the esterifying acids is that they be monocarboxylic acids and that their hydrocarbon residue conform to a particular limited structure. Thus, the hydrocarbon residue of these acids does not contain more than 18 carbon atoms and is alkyl, cyclopentylalkyl, alkylcyclopentyl, cyclopentyl, alkylcyclopentylalkyl, cyclohexyl, alkylcyclohexyl, cyclohexylalkyl, alkylcyclohexylalkyl, dicyclopentyl, dicyclohexyl, alkyldicyclohexyl, alkyldicyclopentyl, phenyl, phenylalkyl, alkylphenyl, alkylphenylalkyl, diphenyl, diphenylalkyl, alkyldiphenyl, and the like.

There are two additional requirementst which must be met by these esterifying acids and/or mixtures thereof. These requirements are:

(1) The number or the average number of carbon atoms contained by the acids or by the acid residues of the esters must fall within a prescribed range; and (2) The acid residues of the esters or the acids must have a proper Average H. Number. The H. Number is defined further below. The term acid residue, hereinafter, signifies the acid moiety of the esters and also all carbon atoms of the acids.

Before discussing these requirements, it should be pointed out that in this invention, the acids are employed either individually or in various combinations with each other to esterify the polyols described above. In this manner, there are prepared esters having one type of acid residue or mixed esters having various combinations of acid residues. In further defining below the esterifying acids, the distinction is at all times maintained between individual acids and combinations thereof.

In this manner the acids are further characterized by having—

(1) When one esterifying acid only is used:
 (a) An Individual H. Number, as defined below, of 8 to 16.5; and
 (b) An individual content of 5 to 7 carbon atoms; and (2) When a mixture or combination of esterifying acids is used:
 (a) An Average H. Number, as defined below, of 8 to 16.5; and
 (b) A carbon atom content averaging to within a range of 5 to 7 inclusive.

The correct hydrocarbon structure, the carbon atom content, and particularly the H. Number of the acid residues all are essential to the success of this invention since it has been found that these characteristics are related to superior electrical qualities. The average carbon atom content of acid residues, to which reference is made in this invention, is somewhat related to the compatibility of the plasticizing ester in the vinyl halide polymers. This number is further discussed in the section dealing with amounts of plasticizer in the polyvinyl compositions.

The H. Number, to which reference is made in this invention, is a composite measure of the number and position of substituents onto alpha and beta carbon atoms on acid residues. These numbers reflect the contribution of these substituents to the general quality of the final product. The manner in which H. Numbers for acid residues are computed is shown below.

(A) Each aliphatic carbon atom beta to a carboxyl or a carbalkoxyl group has a value of 3.5, (B) Any open-chain aliphatic carbon atom gamma to a carboxyl or a carbalkoxyl group has a value of 3, (C) Any carbon atom included in a cycloalkyl group and gamma to a carboxyl or a carbalkoxyl group has a value of 3, and any carbon atoms in the 3 and 4 ring positions in any cyclopentyl group and any carbon atoms in the 3, 4, and 5 ring positions of any cyclohexyl group having a value of zero, (D) Any phenyl or alkyl-substituted phenyl group attached to the carbon atom alpha to a carboxyl group has a value of 4.5, (E) Any phenyl or alkyl-substituted phenyl group attached to the carbon atom beta to a carboxyl or a carbalkoxyl group has a value of 3, (F) Any phenyl or alkyl-substituted phenyl group attached directly to a carboxyl group has a value of 1.

The total values obtained in items A+B+C+D+E+F represent the Individual H. Number for an acid residue of an ester or the Individual H. Number of an acid to which, it should be noted, this H. Number determination is just as applicable. Aliphatic carbon atom refers to carbon atoms which are part of saturated aliphatic hydrocarbon groups whether in alkyl or cycloalkyl groups. The case where a phenyl or alkyl-substituted phenyl group is directly attached to the carboxyl group, i.e., where the alpha carbon is part of the phenyl group is a somewhat special situation. Under certain conditions such a phenyl group has given values higher than 1 and within the range of 2 to 5. In higher ranges viscosity tends to affect some products. Under some conditions desirable combinations may be made with such phenyl groups having values of 2 and 3. At the present time, the value greatly preferred is 1 because it gives esters with very desirable properties.

Illustrations 1 to 3 of computation of Individual H. Numbers is shown below:

α,α-Diisopropylbutyric having 3 beta and 5 gamma aliphatic carbon atoms has an Individual H. Number of 25.5

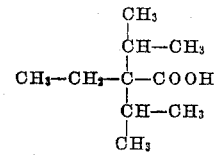

α-Methylcyclopentylacetic having 2 beta and 2 gamma carbon atoms has an Individual H. Number of 13.0

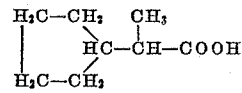

β-(m-Tolyl) propionic acid having 1 beta carbon atom and a methyl substituted phenyl group bonded to the carbon beta to the carboxyl group, has an Individual H. Number of 6.5

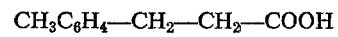

Individual H. Number of other monocarboxylic acids and of acid residues in the esters are computed in a similar manner.

As pointed out above more than one acid commonly is employed to esterify the designated polyols and in such a situation the particular mixture or combination of esterifying acids which is used is characterized by what herein is called an Average H. Number. This is a composite of Individual H. Numbers.

Individual H. Numbers of an acid or an acid residue in the ester are determined as described above and the Average H. Number is obtained by multiplying each Individual H. Number by the mole fraction in which the corresponding acid is employed in a particular combination or mixture of acids, and totaling the numerical product so obtained.

It should be noted that in accordance with the values assigned to alpha and beta substituents Individual H. Numbers from 0 to 37.5 are possible. Acids having Individual H. Numbers from 0 to 25.5 are of particular value in this invention. As monocarboxylic acids having Individual H. Numbers from 25.5 to 37.5 become more readily available such acids may prove to be of especial interest. The H. Numbers to which reference is herein made and the numbers assigned to alpha and beta substituents are a convenient method of definition and of evaluation. Other such systems or nomenclatures may also be applied.

As described above, the term average carbon atom content is employed for characterizing a mixture or combination of esterifying acids. Similarly to the Average H. Number, the average carbon atom content of acid residues is obtained by multiplying the carbon atom content of an individual acid residue by the mole fraction in which the corresponding acid is employed in a particular combination, and totaling the numerical products so obtained. In Table I there is shown how to compute an Average H. Number and carbon content for a typical useful mixture from different monocarboxylic acids.

TABLE I

*Computation of Average H. Number and of average carbon atom content*

| Acids | (1) | (2) | (3) | (4) | (5) |
|---|---|---|---|---|---|
| Valeric | 6.5 | 5 | 0.329 | 2.14 | 1.645 |
| 4-methylpentanoic | 6.5 | 6 | 0.29 | 1.885 | 1.74 |
| 2-ethylbutyric | 13.0 | 6 | 0.231 | 3.0 | 1.39 |
| heptanoic | 6.5 | 7 | 0.15 | 0.975 | 1.05 |
| Average H. Number | | | | 8.0 | |
| Average Carbon Atom Content of this mixture of acids | | | | | 5.825 |

In column (1) there is shown Individual H. Numbers; in column (2) individual carbon atom content; in column (3) mole fraction used in this mixture; in column (4) product of (1) by (3); and in column (5) product of (2) by (3).

This particular combination of monocarboxylic acids, illustration 4 of Table I, therefore, has an Average H. Number of 8.0 and a carbon atom content average of 5.83. It is a suitable mixture of acids to esterify the specified polyols to yield the very valuable plasticizing esters of this invention. This computation is applied in the same manner to other acid mixtures and to acid residues of the esters. Various modifications of the respective amounts and type of acid used are conveniently performed providing the limits of Average H. Number and carbon number are observed. For instance, the Average H. Number may be increased by increasing the molar fraction of acids having the higher Individual H. Number, e.g., here 2-ethylbutyric. The Average carbon atom content may be decreased or increased by modifying the molar fraction of an appropriate acid.

Illustrative monocarboxylic acids of the specified hydrocarbon structure and their respective Individual H. Number are set out below. They may be used singly or in proper combinations with each other in accordance with the requirements of H. Number, content of carbon atoms, and melting point limits of the esters as set out above.

| Acids: | H. Number |
|---|---|
| Acetic | 0 |
| Benzoic | 1 |
| t-Butylbenzoic | 1 |
| p-Toluic | 1 |
| o-Toluic | 1 |
| o,p-Toluic | 1 |
| Propionic | 3.5 |
| Phenylacetic | 4.5 |
| γ-Ethylhexanoic | 6.5 |
| Butanoic | 6.5 |
| Pentanoic | 6.5 |
| γ-Methylpentanoic | 6.5 |
| Heptanoic | 6.5 |
| δ-Methylpentanoic | 6.5 |
| n-Hexanoic | 6.5 |
| Myristic | 6.5 |
| γ-Ethylhexanoic | 6.5 |
| β-Phenylpropionic | 6.5 |
| β-(m-Tolyl)propionic | 6.5 |
| γ-Phenylbutyric | 6.5 |
| δ-Phenyl-n-valeric | 6.5 |
| β-Cyclopentylpropionic | 6.5 |
| β-(4-methylcyclopentyl)propionic | 6.5 |
| γ-Cyclopentylbutyric | 6.5 |
| Stearic | 6.5 |
| Octanoic | 6.5 |
| Nonanoic | 6.5 |
| Decanoic | 6.5 |
| Undecanoic | 6.5 |
| γ-Methylhexanoic | 6.5 |
| Lauric | 6.5 |
| Palmitic | 6.5 |
| α-Methylpropionic | 7 |
| Cyclopentanecarboxylic | 7 |
| Cyclohexanecarboxylic | 7 |
| α-Methylphenylacetic | 8 |
| α-Methyl-α-o-tolylacetic | 8 |
| Diphenylacetic | 9 |
| β-Methylbutyric | 9.5 |
| α-Cyclopentylacetic | 9.5 |
| β,β-Diphenylpropionic | 9.5 |
| β-Ethylpentanoic | 9.5 |
| β-Methylpentanoic | 9.5 |
| β-Methylhexanoic | 9.5 |
| β-Ethylhexanoic | 9.5 |
| (2,6-dimethyl-1-cyclohexyl)acetic | 9.5 |
| (2,5-dimethyl-1-cyclohexyl)acetic | 9.5 |
| (2-methyl-1-cyclohexyl)acetic | 9.5 |
| Cyclohexylacetic | 9.5 |
| (3-methyl-1-cyclopentyl)acetic | 9.5 |
| β-Ethyl-γ-methylpentanoic | 9.5 |
| α-Methylbutyric | 10 |
| α,α-Dimethylbutyric | 10.5 |
| α-Methylpentanoic | 10 |
| 2-ethylcyclopentane-1-carboxylic | 10 |
| 2-methylcyclopentane-1-carboxylic | 10 |
| α-Methylhexanoic | 10 |
| 2-methylcyclohexane-1-carboxylic | 10 |
| 2,5-dimethylcyclohexane-1-carboxylic | 10 |
| α-Methyl-γ-phenylbutyric | 10 |
| α-Methyl-β-phenylpropionic | 10 |
| α,α-Dimethylpropionic | 10.5 |
| 1-methylcyclopentane-1-carboxylic | 10.5 |
| 1-methylcyclohexane-1-carboxylic | 10.5 |
| α-Ethylphenylacetic | 11 |
| α,α-Dimethylphenylacetic | 11.5 |
| β,β-Dimethylbutyric | 12.5 |
| (1-methyl-1-cyclohexyl)acetic | 12.5 |
| (1,3-dimethyl-1-cyclopentyl)acetic | 12.5 |
| (1-methyl-3-ethyl-1-cyclopentyl)acetic | 12.5 |
| α-(1-methyl-1-cyclopentyl)acetic | 12.5 |
| α-methyl-β,β-diphenylpropionic | 13 |
| α,β-Dimethylbutyric | 13 |
| α,β-Dimethyl-β-phenylpropionic | 13 |
| α-Ethylbutyric | 13 |
| α-n-Butylhexanoic | 13 |
| α-Ethylpentanoic | 13 |
| α-Ethyl-γ-phenylbutyric | 13 |
| α-Ethylhexanoic | 13 |
| α-β-Dimethyl-γ-phenylbutyric | 13 |
| α-Ethyl-γ-methylpentanoic | 13 |
| α-Methyl-β-ethylpentanoic | 13 |
| α-Methylcyclopentylacetic | 13 |
| α-n-Propylhexanoic | 13 |
| α-Methylcyclohexylacetic | 13 |
| 1-methyl-2-ethylcyclopentane-1-carboxylic | 13.5 |
| 1,2-dimethylcyclopentane-1-carboxylic | 13.5 |
| α,α-Dimethyl-γ-phenylbutyric | 13.5 |
| α,α-Dimethyl-β-cyclopentylpropionic | 13.5 |
| α,α-Dimethyl-β-phenylpropionic | 13.5 |
| Triphenylacetic | 13.5 |
| α,α-Dimethylbutyric | 13.5 |
| α-Methyl-α-(1-methyl-1-cyclohexyl)acetic | 16 |
| α-Ethylcyclopentylacetic | 16 |
| 2,2,6-trimethylcyclohexane-1-carboxylic | 16 |
| α-Isopropylpentanoic | 16 |
| α-Ethyl-β-methylbutyric | 16 |
| α,α-Dimethyl-β-methylhexanoic | 16.5 |

Acids: H. Number
- α,α-Dimethylcyclohexylacetic — 16.5
- 1,2,2-trimethylcyclopentane-1-carboxylic (Camphonanic) — 16.5
- α-Ethyl-α-methylbutyric — 16.5
- α-Isopropyl-β-methylbutyric — 19
- Dicyclopentylacetic — 19
- α,α,β,β-tetramethylbutyric — 19.5
- Triethylacetic — 19.5
- α,β-dimethyl-α,β-diethylcaprylic — 22.5
- Tri(t-butyl)acetic — 37.5

It should be noted that if it is desired to increase an average number of carbon atoms in a mixture of acids there may be used any of the above-listed acids or similar ones having on alpha or beta carbons or any other carbons, instead of a methyl substituent, any convenient other alkyl substituents such as ethyl, butyl, propyl, hexyl, and the like.

It is clear that what this invention requires from one skilled in the art is selecting for the esterification of the specified polyol any number of appropriate monocarboxylic acids in such proportion that their Average H. Number and average number of carbon atoms fall within the prescribed limits. Various adjustments and modifications are made in the type and amounts of acids employed as it is desired to increase or decrease the H. Number and/or content of carbon atoms of the acid residues and/or the final melting point of the ester. For further convenience in the practice of this invention there is provided below general Formula 1 and 2 whereby any one may precisely determine any Average H. Number, any average content of carbon atoms, or the amount and type of esterifying acids that are to be used in any particular mixture of acids meeting the requirements of this invention.

(1)
$$\sum_{i=1}^{i=x}(m_i)(C_i) = \text{Average Carbon Atom Content} = ACAC$$

(2)
$$\sum_{i=1}^{i=q}(m_i)(H_i) = \text{Average H. Number} = AH.No.$$

where $m_i$ equals the mole fraction of each esterifying acid ($i$) employed in any particular mixture or combination of acids, a mole fraction being defined as:

$$\frac{Mi}{M}$$

or the number of moles of any acid used ($M_i$) divided by M the total number of moles of acids in the mixture; $q$ equals the number of different acids employed, this number for practical purposes is from 1 to 8 but mixtures of acids containing more than 8 different acids such as 10 or 12 may also be employed. $C_i$ equals the individual carbon atom content of each acid $i$, and $H_i$ equals the Individual H. Number.

The foregoing definitions of average carbon atom content and Average H. Number apply to any mixture of acids and are independent of the polyol or polyol mixture to be esterified. For the polyol mixtures, a value $n$ may be defined as the average number of equivalents of esterifiable hydroxyl groups per mole of polyol. $n$ equals any integer or fractional number from 4 to 8 inclusive. For example, $n$ may average to a maximum value of 8 when tripentaerythritol or mixtures containing higher polypentaerythritols than tripentaerythritol are employed.

Table II shows computation of $n$, the average number of esterifiable hydroxyl groups per mole, when a mixture of pentaerythritol and dipentaerythritol is prepared in molar ratio of 77/23, respectively.

TABLE II

Computation of the average number of esterifiable hydroxyl groups in a mole of polyol mixture

| Number of Hydroxyl Groups in the Polyol (a) | Mole Fraction of Polyol Used (b) | Product of (a) and (b) |
|---|---|---|
| 4 | .77 | 3.08 |
| 6 | .23 | 1.38 |
| $n=$ | | 4.46 |

A mixture of tripentaerythritol, dipentaerythritol, and pentaerythritol is prepared in molar fractions of 26/16/58, respectively. In such a case $n=5.36$. For tripentaerythritol $n=8$ and in mixtures of higher polypentaerythritol the amount of tripenta-, dipenta-, and pentaerythritol may be sufficient to provide 8 esterifiable hydroxyl groups. The number of esterifiable hydroxyl groups of any individual polypentaerythritol employed in a polyol mixture being known, $n$ accordingly is computed in the same way for any particular polyol mixture. In the final ester, $n$, the number of hydroxyl equivalents in the polyol mixture, is equal to M, the number of moles in the acid mixture. Therefore, having obtained $n$, the number of moles ($M_i$) of a particular acid to be employed with a particular polyol mixture is obtained by multiplying the molar fraction $m_i$ of the acid in the acid mixture by $n$. In Table III there is shown a useful mixture of esterifying acids.

TABLE III

| Acids | (1) | (2) | (3) |
|---|---|---|---|
| (1) α,α-dimethyl-β-methylbutyric | .54 | 16.5 | 7 |
| (2) α-ethyl-α-methylbutyric | .27 | 16.5 | 7 |
| (3) α,α-dimethylpropionic | .19 | 10.5 | 5 |
| Average H. Number for this acid mixture | | | =15.1 |
| Average content of carbon atoms for this acid mixture | | | =6.62 |

In column (1) there is shown molar fraction ($m_i$) in the acid mixture; in column (2) Individual H. Number; and in column (3) individual carbon content.

This acid mixture may be used to esterify a polyol mixture made up with: pentaerythritol, dipentaerythritol, and tripentaerythritol in a 22:75:3 ratio, respectively. The number of hydroxyl groups, $n$, is computed as above and $n$ in this case equals 5.62. The product of $n$ by the mole fraction of the acid in the mixture gives the number of moles of α,α-dimethyl-β-methylbutyric, α-ethyl-α-methylbutyric, and α,α-dimethyl-propionic that may be used for esterifying this particular polyol mixture. The number of moles of acid is 3.03, 1.52, and 1.07, respectively.

Dipentaerythritol and pentaerythritol are mixed in a 90:10 ratio. $n$ equals 5.8. An acid mixture of α,α-dimethylbutyric, α-ethylbutyric, and acetic is made up in a 6:3.5:0.5 ratio, respectively. The number of moles of acid required for esterification is 3.48, 2.03, and 0.29, respectively. The acetic acid may be increased to give a ratio of 6:3:1, respectively. The average carbon atom content is 5.5; the average H. Number is 11.3. The number of moles of each acid required for esterification is 3.48, 1.74, and 0.58, respectively. In the same manner moles of acids for esterification for other polyol mixtures are determined. Also other acid mixtures within the scope of the invention may be used to esterify this polyol mixture.

Dipentaerythritol and pentaerythritol in an 85:15 ratio are esterified with a mixture of α,α-dimethylpentanoic acid, α-methylpentanoic and acetic acids in an 8:1:1 ratio. $n$ for this polyol mixture equals 5.7. The number of moles of each acid required for esterification is 4.57, 0.57, and 0.57, respectively. Other similar acid mixtures within the scope of this invention may be employed in the same way to esterify this polyol mixture. Other mixtures of the specified polyol may be esterified in a similar manner. Dipentaerythritol and pentaerythritol in an 80:20 ratio are esterified with α,α-diisopropylcaprylic, α,α-dimethylbutyric and acetic in a 1:8:1 ratio, respectively. $n$ for this polyol mixture equals 5.6. The average carbon atom content is 6.4; the average H. Number is 13.3. The number of moles of each acid required for esterification is 0.56, 4.48, and 0.56, respectively. Other such typical acid mixtures may be used in the proper ratio. Polyol mixtures may include varying amounts of higher polypentaerythritols, their average hydroxyl number not exceeding 8.0. These esters are plasticizers for polyvinyl chloride compositions and impart thereto excellent electrical resistance.

Further valuable plasticizing esters may be prepared from the specified polyol or mixtures thereof esterified with specified mixtures of acids. Illustrations 5 to 27 below further disclose such useful mixtures.

(5) α,α-Dimethylbutyric and α-ethylbutyric;

(6) α,α-Dimethylpentanoic and α-methylpentanoic;

(7) α,α-Dimethyl-β-methylbutyric, α-ethyl-α-methylbutyric, and α-ethylpentanoic;

(8) α,α-Diisopropylcaprylic, α,α-dimethylpropionic, and α-methylpropionic;

(9) α,α-Diisopropylcaprylic, α-ethyl-α-methylbutyric, α,α-dimethylpropionic, and acetic;

(10) α,α-Diisopropylcaprylic, α,α-dimethylbutyric, and α-methylpropionic;

(11) α,α-Dimethylbutyric, triethylacetic, and butyric;

(12) α,α-Dimethyl-β-methylbutyric, acetic, and triethylacetic;

(13) Butyric and cyclohexylacetic for esterification of tripentaerythritol, for instance, in molar fraction of 4.2 and 3.8 respectively; and the AH. No. is 8.07 and the ACAC is 6.1;

(14) Dicyclopentylacetic, α-methylbutyric, and isobutyric for esterification of dipentaerythritol, for instance, in molar fractions of 1,4, and 1, respectively, giving an AH. No. of 11.0 and an ACAC of 6.0. Similarly, fractional molar amounts are employed such as 1.5, 4, and 0.5 yielding an AH. No. of 12 and an ACAC of 6.67;

(15) Diphenylacetic, β-methylbutyric, and acetic with pentaerythritol, for example, in fractional molar amounts of 0.125, 0.625, and 0.25, respectively, giving an AH. No. of 9.25 and an ACAC of 6;

(16) n-Hexanoic, α-methylpentanoic, and β-methylpentanoic with dipentaerythritol, for instance, in molar amounts of 0.10, 0.50, and 0.40, respectively giving an AH.No. of 9.45 and an ACAC of 6;

(17) α-Ethylbutyric acid and isobutyric acid in a 1:1 mole ratio having an ACAC of 5 and an AH.No. of 10;

(18) α-Ethylhexanoic acid and n-butyric acid in a 1:1 mole ratio having an ACAC of 6 and an AH.No. of 9.75;

(19) Phenylacetic, α-ethylbutyric, and α-methylpentanoic in a 1:3.9:3.1 molar ratio having an ACAC of 6.25 and an AH.No. of 10.78;

(20) Benzoic, α-methylpentanoic, and n-hexanoic in a 1:5.2:1.8 molar ratio having an ACAC of 6.13 and an AH.No. of 8.09;

(21) α-Methylheptanoic and n-pentanoic in a 2:1 molar ratio having an ACAC of 7 and an AH.No. of 8.83;

(22) α-Methylpentanoic, β-methylpentanoic, γ-methylpentanoic, n-hexanoic, α-ethylbutyric, α,β-dimethylbutyric, α,α-dimethylbutyric, and β,β-dimethylbutyric in an equimolar ratio having an ACAC of 6 and an AH.No. of 10.56;

(23) Myristic, diisopropylacetic, and acetic in a 1:4:3 molar ratio having an ACAC of 6.5 and an AH.No. of 10.33;

(24) α,α-dimethylbutyric and α,α-diethylbutyric in a 1:1 molar ratio having an ACAC of 7 and an AH.No. of 16.5;

(25) Stearic and 2-ethylbutyric in a 1:9 molar ratio having an ACAC of 7.2 and an AH.No. of 12.4;

(26) n-Pentanoic and α-methylbutyric in a 5.7:4.3 ratio having an ACAC of 5 and an AH.No. of 8;

(27) α-Isopropylbutyric and α-methylpentanoic in a 1:1 molar ratio having an ACAC of 7 and an AH.No. of 13.

Each and every one of the above mixtures of acids may be employed to esterify the specified polyols in the manner described below. The resulting esters have the specified polypentaerythritol, and/or pentaerythritol and mixture thereof as their alcohol residue and their acid residue is made up with the above acids.

Once a desired combination of acids having the specified H. Number and carbon atom number content has been prepared, or once an individual appropriate single acid has been selected, such acid or acids are reacted with the specified polyols to esterify the hydroxyl groups. Any method whereby the ester is prepared in a successful and effective manner is suited for the invention.

Numerous such convenient methods may be used as heating the polyhydric alcohols with acids or anhydrides, with or without catalyst and with or without solvent under conditions favorable for removal of water. Generally, in the preparation of these esters the reactants are charged to a reaction vessel equipped with stirring and heating units. Small amounts of the usual acidic catalysts ordinarily employed in esterification procedures may be used but their presence is not essential. For instance, acidic esterification catalysts may be used in the direct esterification process, for instance, sulfuric, hydrochloric acids, p-toluene sulfonic acid, arane and alkane sulfonic acids, such as ethane sulfonic acid, chloroacetic acid, boron and silicon fluorides, acid salts such as monosodium sulfates, and salts of strong acids and weak bases, such as aluminum sulfate, zinc sulfate, boron trifluoride etherate, $AlCl_3$, $ZnCl_2$, aluminum alkoxides such as aluminum diisopropoxide, tetraisopropyl titanate, and the like. The amount of catalyst which may be employed varies over a wide range depending upon the particular reactants, catalyst, and reaction conditions. In most cases, the amount of catalyst is between about 0.1 to about 5% by weight of reactants. Preferred amounts of catalysts to be employed in the esterification process is between ½% to 2% by weight of reactants.

While the proportions of acid and polyol may vary over a considerable range, since all hydroxyl groups should theoretically be esterified, it is preferable to react the polyol mixture with at least an equivalent amount of the acids. Practically ratios of equivalents of alcohol to equivalents of total acid preferably vary between 1:1 and 1:1.5 to the theoretical amount. The exact proportions of acid and alcohol to be used, however, may be best determined in each individual case taking into consideration the method to be used for esterification. The reaction mixture then is heated at atmospheric pressure and at elevated temperatures, for example, up to about 250° C. and occasionally to 280° C. or higher, for a period of from 2–35 hours or more, while, at the same time, there is removed the water of esterification produced during that time. Heating is preferably conducted in a manner calculated to cause an incremental increase in temperature of the reaction mass during the period of the reaction with the concurrent decrease in acid number. The esterification may be accomplished in the absence or the presence of appropriate solvents. Esterification methods in the absence of solvents is much preferred. When no other solvent is used, excess of the esterifying acids serves this purpose well. Alternatively, stoichiometric amounts may be employed, either in the presence or the absence of an inert solvent.

The final desired plasticizing ester also may be prepared by other procedural modifications such as by modification of the acid residues of esters of the specified polyols by transesterification. In this manner, such esters are modified to the extent desired by displacement of the undesirable acid moieties. For instance, an ester of the specified polyol not fulfilling the requirements of this invention is subjected to a treatment whereby the more volatile acid residues of such ester are removed and substituted by the desired proportion of acid residues selected in such manner that the requirements in H. and carbon numbers are met. By this procedure, a polyol esterified with low aliphatic monocarboxylic acids, such as acetic, propionic, and limited amounts of butyric or mixtures thereof is heated under conditions favoring transesterification in the presence of the required amount of appropriate acid or the lower alkyl ester of such acid until the desired ester is obtained. This procedure improves the starting ester by raising its Average H. Number and/or average number of carbon atoms within the specified limits. Thus, it should be noted that there are numerous methods and modifications thereof whereby these esters can be produced in a successful and effective manner.

Regardless of the esterification method employed it is necessary that the esterification be substantially complete and therefore that the hydroxyl content of the ester be as low as possible. The hydroxyl number is generally below 15, and more often below 10 and close to about 5 depending on the reaction conditions and the amount of acid used for esterification. Preferably the hydroxyl content should be below 1 and even more desirably it should be as close as practical to zero. Means for measuring the percent hydroxyl may be found described in the literature such as for instance in "Organic Analysis," volume 1, published by Interscience Publishers, Inc., New York, N.Y. (1953). If desired, although not necessary, subsequent to the esterification there may be used, for further decreasing the hydroxyl number of the ester, any convenient method such as for instance acylation with agents such as ketenes, acid chlorides, anhydrides, e.g., propionic and butyric anhydride, acetyl chloride, acetic anhydride and the like. Excess reagent and/or solvent may be removed by fractional distillation under reduced pressure. The ester has an acid number below 2.0, preferably in the range of 1.0 to 0.5. A range from 0.5 to 0.0 is much preferred. Esters low in acidity may also be obtained by further washing, after stripping, with an alkaline solution, such as with sodium carbonate, sodium hydroxide, potassium carbonate, and the like. After stripping off solvent, there may be added to the ester about 1 to 3% by weight of carbon black and the mixture may be heated at 120° to 200° C. at atmospheric pressure for about ½ to 3 hours, preferably for about 1 hour.

Illustrative preparations of esters are shown below. They are not to be construed as limiting the scope of this invention. All parts are by weight.

EXAMPLE 1

To a flask equipped with a stirrer and a distillation column and receiver are added 515.1 parts of α-ethylbutyric acid and 151.4 parts of dipentaerythritol. The reaction mixture is heated gradually to and at 225° C. for a total of thirty-one hours during which time 64.3 parts of water are collected in the receiver. The pressure is reduced to 1 mm. Hg for fifteen hours to remove the excess α-ethylbutyric acid. The reaction mixture is cooled and after adding 50 parts of acetic anhydride the reaction mixture is held at 150° C. for one hour, after which vacuum is applied to remove acetic anhydride and acetic acid. The final dipentaerythritol hexa(α-ethylbutyrate) is a clear liquid having a Gardner-Holdt viscosity of T; acid number, 0.64; molecular weight, 832±12 (theoretical 842); saponification number, 389 (theoretical 400); iodine number, 0.22 and a corrected hydroxyl number of 0.

Forty parts of this ester are milled into 60 parts of polyvinyl chloride on hot rolls. The plasticized polyvinyl chloride has superior electrical properties; a volume resistivity at 90° C. of 1300% of that of di-2-ethylhexyl phthalate-plasticized polyvinyl chloride stock, and a volume resistivity at 60° C. under wet conditions of 2500% of that of the di-2-ethylhexyl phthalate stock.

In the same manner there are prepared from pentaerythritol, tripentaerythritol, the specified polypentaerythritol and from mixtures thereof yielding the mixed α-ethyl-α-methyl-butyrate α-ethylbutyrate α,α-dimethyl-β-methylbutyrate, and the mixed α,α-dimethylpropanoate α-ethylbutyrate α-methyl-β-methylbutyrate.

Volume resistivity tests show that polyvinyl chloride compositions plasticized with such ester have values of 1000% superior to conventional plasticizers.

EXAMPLE 2

A mixture of 162 parts of α-methylpentanoic acid, 162 parts of n-hexanoic acid, 216 parts of β-methylpentanoic acid, 151.4 parts of dipentaerythritol, 0.6 part of a 72° Bé. solution of zinc chloride in water, and 0.05 part of triphenyl phosphite, is stirred under a steam-jacketed column to 168° C. Water commences distilling; heating is continued until the pot temperature rises to 220° C. where it is held for thirty-three hours. Pressure is reduced to 1 mm. Hg while the pot temperature is held at 210° C. for four and one-half hours. Five parts of carbon black are then added to the resin; the mixture is stirred at 150° C. for one hour. The product is filtered giving 459 parts of a clear liquid having a Gardner-Holdt viscosity of J—; a molecular weight of 823±11; a saponification number of 388; iodine number of 0.48; an acid number of 1.7; a hydroxyl number of 0.00; an ACAC of 6, and an AH. No. of 8.75.

In the same general method as shown above from dipentaerythritol there are prepared the α-methylpentanoate n-hexanoate β-methylpentanoate; the α-methylbutyrate α-ethyl-γ-methylpentanoate; the α-ethyl-γ-methylpentanoate acetate; the α-methylbutyrate n-hexanoate; and similar others. Volume resistivity tests demonstrate that compositions plasticized in accordance with this invention have electrical properties of about 200 to 800% superior to those of conventional compositions.

EXAMPLE 3

A mixture of 839.6 parts of α-methylpentanoic acid and 305.8 parts of dipentaerythritol are stirred and heated until a controlled distillation of water is obtained. The batch is then heated to 240° C. until most of the water has been removed. High vacuum is then applied for 10 hours. The batch is then treated with acetic anhydride, stripped and filtered. Final constants are: Gardner-Holdt viscosity F—; corrected hydroxyl number=0; ACA of 6.0 and an AH. No. of 10.0.

Following the same general procedure the other specified polyols, like mixtures of dipentaerythritol and pentaerythritol are employed in a very satisfactory manner. These plasticizers impart to polyvinyl compositions electrical properties increased by 100 to 1000% over those of conventional plasticizers.

EXAMPLE 4

A mixture of 302.9 parts of α-methylbutyric acid, 213.8 parts of α-ethylhexanoic acid, 150.7 parts of dipentaerythritol, and 0.05 part of triphenylphosphite are condensed in the general manner shown in Example 1, and the ester stripped of excess acid and filtered to yield 472 parts of tetra-α-methylbutyrate di-α-ethylhexanoate of K viscosity (Gardner-Holdt), 393 saponification number, ACAC of 6 and an A.H. No. of 11.

Other polyols of the specified group are treated in the same general fashion. The esters are superior plasticizers for compositions designed for electrical applications.

EXAMPLE 5

A mixture of 102 parts of pentaerythritol, 179 parts of dipentaerythritol, and 839.6 parts of α-ethylbutyric acid is heated gradually to 250° C. and then subjected to high vacuum conditions for five hours. The product is then treated with carbon black and filtered to give a material having a molecular weight of 790±15, an ACAC of 5 and an AH. No. of 13.

In substantially the same manner other acids and acid mixtures are employed to esterify pentaerythritol, dipentaerythritol, and polypentaerythritol mixtures. The products, which are mixed esters of mixed acids and mixed alcohols, are excellent plasticizers for polyvinyl compositions for electrical applications.

EXAMPLE 6

A mixture of 386.3 parts of α-methylpentanoic acid, 162 parts of phenylacetic acid, and 152 parts of dipentaerythritol are stirred and heated in a manner similar to that of Example 1. The final product has a corrected hydroxyl number of 0.0 and a saponification number of 400, and an ACAC of 6.5 and an AH. No. of 8.6.

In the same general method there are prepared with appropriate alcohols selected from the specified group other mixed esters such as the α-ethylphenylacetate α-ethylbutyrate α-methylpentanoate ester of dipentaerythritol, and the myristate diisopropylacetate acetate ester of dipentaerythritol. Electrical resistivity tests of plasticized compositions containing such esters show values over 500% superior to those obtained in conventional compositions.

EXAMPLE 7

A mixture of 342 parts of α-ethylhexoic acid and 150.9 parts of dipentaerythritol is stirred and heated to and held at 235° C. Water of condensation (43.5 parts) is collected. To this are added 173 parts of acetic anhydride and the mixture is refluxed for one hour. The product is tetra-α-ethylhexanoate diacetate. It is then stripped. There is added thereto 4.5 parts of carbon black and the mixture is heated while stirring for one hour at 150° C. and filtered to yield 449 parts of product having a Gardner-Holdt viscosity of O and a saponification number of 371, an acid number of 0.5, and an ACAC of 6 and an AH.No. of 8.7.

Other alcohols of the specified group are esterified in the same general manner. The products are very useful plasticizers for compositions used in electrical applications.

EXAMPLE 8

A mixture of 30.3 parts of α-methylbutyric acid, 21.4 parts of cyclohexylacetic acid, 150.7 parts of dipentaerythritol and 0.05 part of triphenylphosphite are esterified as in Example 1 to give 460 parts of a resin with a saponification number of 400, an acid number of 0.4, and ACAC of 7.0, and an AH.No. of 9.7.

Other polyols of the specified group are esterified in the same general manner. Other appropriate acid mixtures yield mixed esters such as the α-methylpentanoate β-methylpentanoate γ-methylpentanoate ester; and the n-hexanoate α-ethylbutyrate α,β-dimethylbutyrate ester; and the α,α-dimethylbutyrate β,β-dimethylbutyrate ester; and the β-methylpentanoate α-methylcyclohexylacetate ester of the specified polyols. Other appropriate mixed esters containing cyclohexyl and cyclopentyl carboxylic acids are prepared in a similar manner. Electrical resistivity tests of compositions plasticized with such esters show values from 150 to 1000% above that of conventional compositions.

EXAMPLE 9

The procedure of Example 1 is followed. The charge is: 330.35 parts of α-methylbutyric acid, 82.82 parts of palmitic acid, 150.85 parts of dipentaerythritol, 0.05 part of triphenyl phosphite. Temperature rises to 230° C.; distillation time is 33 hours. Product is treated as in Example 1. The oil is pale clear yellow having a Gardner-Holdt viscosity of J; a saponification number of 412, an iodine number of 0.2 and a corrected hydroxyl number of 0.27. It is dipentaerythritol α-methylbutyrate palmitate, in a 5.5:0.5 mole ratio; ACAC is 5.9, AH.No. is 9.7.

In a like manner there is prepared dipentaerythritol tetra(α-methylbutyrate)-di-n-octanoate from 302.9 parts of α-methylbutyric acid, 213.8 parts of n-octanoic acid and 150.7 parts of dipentaerythritol. The product is a clear oil having a Gardner-Holdt viscosity of G; an acid number of 0.28, a corrected hydroxyl number of 0.28; an iodine number of 0.2, a saponification number of 403; ACAC is 6.0 and the AH.No. is 8.83.

In a similar manner dipentaerythritol penta(α-methylbutyrate)-n-decanoate is prepared; its ACAC is 6.0 and its AH.No. is 9.3. Forty parts of each ester are incorporated into 60 parts of polyvinyl chloride. The plasticized compositions have a volume resistivity under wet conditions of about 500% superior to that of the di-2-ethylhexylphthalate stock. Other esters of α-methylbutyric acid and n-decanoic acid in a range of mole ratio of 5.9:0.1 to 3.6:2.4, respectively, are prepared. Compositions plasticized therewith have superior electrical properties.

Generally because of availability and because the excellent electrical resistance displayed in applications the esters of dipentaerythritol are a class of compounds very much favored. In commercial dipentaerythritol a major part, i.e., about 85% or more, is dipentaerythritol, other polyols present are pentaerythritol and other polypentaerythritols. These commercial dipentaerythritols yield esters which form a very desirable group of the compounds of this invention. Another group of particular interest are esters having as one of their acids α-methylbutyric acid. Esters of α-methylbutyric acid mixed with a prescribed amount of an 8 to 16 carbon-atom-containing-acid having an Individual H. Number of 6.5 have especial value.

By way of contrast there are prepared esters of pentaerythritol and of polypentaerythritols which are outside the scope of this invention. Their electrical and/or other properties are found not to be satisfactory.

EXAMPLE A

To a flask equipped with a stirrer and a distillation column and receiver there are added 534.0 parts of distilled α-ethylhexanoic acid, 125.75 parts of dipentaerythritol and 0.61 part of a 72° Bé. aqueous zinc chloride solution. The reaction mixture is heated as described in Example 1. The final hexa-ester has an AH.No. of 13, an ACAC of 8, a Gardner-Holdt viscosity of N—; acid number, 1.74; corrected hydroxyl number, 0.0; saponification number, 324; and a molecular weight of 976±2. The product is found to be incompatible with polyvinyl chloride when attempts are made to incorporate the hexa-ester into polyvinyl chloride on hot rolls.

EXAMPLE B

The esterification method described in Example 1 is used with a charge of 121.2 parts of dipentaerythritol, 412.4 parts of γ-methylpentanoic acid, and 0.04 part of triphenyl phosphite. The final dipentaerythritol hexa-γ-methylpentanoate has an AH.No. of 6.5 and an ACAC of 6; a molecular weight of 801±9; a saponification number of 405; an uncorrected hydroxyl number of 0; an iodine number of 0.1; an acid number of 0.53; and a Gardner-Holdt viscosity of H.

This plasticizer is incorporated into polyvinyl chloride as described in Example 1. The plasticized stock has poor electrical properties, having a volume resistivity (at 90° C.) 31% of that of a dioctyl phthalate plasticized polyvinyl chloride of the same composition and a volume resistivity at 60° C. under wet conditions 54% of that of the di-2-ethylhexyl phthalate stock.

EXAMPLE C

The esterification method described in Example 1 is used with a charge of 301.2 parts of dipentaerythritol, 392.1 parts of n-butyric acid and 641.5 parts of n-octanoic acid. The final hexa-ester has an AH.No. of 6.5 and an ACAC of 6, a saponification number of 410, iodine number of 0.24, acid number of 0.95, uncorrected hydroxyl number of 0.7, and a Gardner-Holdt viscosity of D+.

Forty parts of the product are incorporated into 60 parts fo polyvinyl chloride by hot-roll milling. The plasticized stock has poor electrical properties, having a volume resistivity at 90° C., 21% of that of di-2-ethylhexyl phthalate-plasticized polyvinyl chloride and a volume resistivity at 60° C. under wet conditions, 43% of that of the di-2-ethylhexyl phthalate stock.

EXAMPLE D

To a flask equipped with a stirrer and a distillation column and receiver there are added 182.6 parts of $\beta,\beta$-dimethylbutyric acid and 53.3 parts of dipentaerythritol. The esterification is carried out as in Example 1. The final dipentaerythritol hexa-$\beta,\beta$-dimethylbutyrate is a waxy, crystalline solid having an AH.No. of 12.5, and ACAC of 6, an M.P. of 111° C., molecular weight 763±11, saponification number 395, iodine number 0.05, acid number 0.39, and uncorrected hydroxyl number 0.0. The product is found to be incompatible with polyvinyl chloride when an attempt is made to incorporate it into the polyvinyl chloride on hot rolls. A compression molded slab showed blooming of the plasticizer. Esters of pivalic and/or $\alpha,\alpha$-dimethylbutyric acid also give a high melting point.

Examples A to D emphasize the importance of the structural and other limits imposed on the esters of this invention and the unexpected results obtained therewith in electrical applications.

The following are further illustrations of esters of this invention. They are not to be construed as limiting its scope and spirit. The acid fractions may be adjusted to various mixed numbers within the scope of this invention.

Pentaerythritol tetra($\alpha$-ethyl-$\alpha$-methylbutyrate),
Dipentaerythritol hexa($\alpha$-ethyl-$\alpha$-methylbutyrate),
Tripentaerythritol octa($\alpha$-ethyl-$\alpha$-methylbutyrate),
Dipentaerythritol hexa($\alpha$-methylpentanoate),
Tripentaerythritol octa($\alpha$-methylpentanoate),
Pentaerythritol tetra($\alpha$-methylpentanoate),
Pentaerythritol tetra($\alpha$-ethylbutyrate),
Dipentaerythritol hexa($\alpha$-ethylbutyrate),
Tripentaerythritol octa($\alpha$-ethylbutyrate),
Dipentaerythritol tetra($\alpha$-ethylhexanoate)-di(acetate),
Dipentaerythritol tri($\alpha$-methylbutyrate)-tri($\alpha$-ethylhexanoate),
Tripentaerythritol hexa($\alpha$-methylbutyrate)-di(ethylhexanoate),
Pentaerythritol tri($\alpha$-methylbutyrate)-$\alpha$-ethylhexanoate,
Dipentaerythritol tetra(diisopropylacetate)-diacetate,
Dipentaerythritol tetra(methylbutyrate)di($\alpha$-ethyl-$\gamma$-methyl-pentanoate),
Dipentaerythritol hexa-$\alpha$-methylbutyrate,
Dipentaerythritol tetra($\alpha$-ethyl-$\gamma$-methylpentanoate)-di-acetate,
Dipentaerythritol tetra($\alpha$-methylbutyrate)di-n-hexanoate,
Dipentaerythritol penta($\alpha$-methylpentanoate)-phenylacetate,
Dipentaerythritol penta($\alpha$-methylbutyrate)-cyclohexyl-acetate,
Dipentaerythritol penta($\alpha,\beta$-dimethylbutyrate)-(2-ethylcyclopentane-1-carboxylate),
Dipentaerythritol penta($\beta$-ethyl-$\gamma$-methylpentanoate)-pentanoate,
Dipentaerythritol penta($\beta$-methylpentanoate)-(1-methyl-1-cyclopentyl)acetate,
Dipentaerythritol tri($\beta$-methylbutyrate)-diphenylacetic-di-(acetate),
Tripentaerythritol penta($\alpha$-methylpentanoate)-di($\beta$-methylpentanoate)-n-hexanoate,
Dipentaerythritol tetra(diisopropylacetate)-tri(acetate)-myristate,
Dipentaerythritol tetra($\alpha$-methylbutyrate)-di-n-octanoate,
Dipentaerythritol penta($\alpha$-methylbutyrate)-n-decanoate,
Dipentaerythritol $\alpha$-methylbutyrate-palmitate, in a 5.5:0.5 mole ratio.

The esters of all the acid mixtures illustrated above are prepared in accordance with the method shown in the examples. The corresponding esters of pentaerythritol, tripentaerythritol, and polypentaerythritols having an average of eight hydroxyl groups are prepared following the same general method. Polyvinyl cables and wiring plasticized with such esters show marked improvements in electrical applications over conventional compositions.

The materials to be plasticized with the above-described esters include chlorine containing polymers of unsaturated monomers containing a single vinyl, $CH_2=CH-$, group, such as polymers of a vinyl halide, such as vinyl chloride, and copolymers of vinyl chloride with other materials such as vinyl esters of lower aliphatic acids, such as copolymers of vinyl chloride and vinyl acetate, vinyl propionate, and copolymers of vinyl chloride and vinylidene chloride. Preferably, the chlorine-containing vinyl copolymers plasticized in accordance with this invention contain a predominant quantity of the monomeric units as vinyl chloride units. Particularly preferred polymers are vinyl chloride polymers having from 80% to 100% vinyl chloride units.

The amount of plasticizing ester to be incorporated within the halogen polymers may vary over a considerable range. The amount depends upon whether these plasticizing esters are used as primary plasticizers alone or in conjunction with other conventional plasticizers as secondary plasticizers. It also depends on the amount of vinyl chloride polymer used and particularly on the intended use of the plasticized composition. When the composition is to be used to produce fairly rigid articles the amount of plasticizing ester used as primary plasticizer generally will vary from about 50 to 5 parts per 100 parts of polymer. Below 10 parts, the material is difficult to fabricate, and its physical characteristics tend not to be satisfactory. About 20 to about 40 parts of plasticizing ester, as primary plasticizer, per 100 parts of final plasticized polymer and particularly about 40 parts per 100 parts of final plasticized polymer, are exceptionally satisfactory combinations for polymeric compositions to be used in electrical applications. The plasticizing esters of this invention may also be used as secondary plasticizers in combination with other common plasticizers. In such applications the plasticizer esters of this invention preferably make up at least 25% of the total plasticizer.

It should be clearly understood that there is a relationship, as yet not fully explained, between the quality of the polymeric compositions, especially the compatibility of the esters with the polyvinyl halide compositions and the above-discussed average carbon atom content of the acid residues. Therefore since the esters tend to be less compatible as the average carbon increases above 7.0 that average is carefully maintained within the range from 5 to 7 inclusive when the esters of this invention make up at least about 40 parts per 100 parts of final plasticized stock. When there are used less than 40 parts, but from about 20 to 40 parts of plasticizing ester for 100 parts of plasticized polymer, then the average number of carbon atoms may be somewhat increased to about 7.3 while the Average H. Number is maintained within the specified range. As the amount of plasticizing ester is further decreased to within 10 to 20 parts per 100 parts of plasticized polymer, or when the esters are used as secondary plasticizers, a small further increase in average number of carbon atoms to about 7.5 is possible. Thus, the plasticizing esters of this invention have an average carbon atom number of about 5 to about 7 when used as primary plasticizers, of about 5 to about 7.5 when used in less than 40 parts per 100 parts of polymer or as secondary plasticizer and an Average H. Number of 8.0 to 25.5 whether the ester is used as primary or as secondary plasticizer for vinyl chloride polymers.

The illustrations of combinations of acids having average number of carbon atoms above 7.0 which are provided below may be employed to esterify the specified polyols or mixtures thereof, to yield plasticizing esters, having a melting point of 35° C. or below and which are used in amounts of less than 40 parts per 100 parts of vinyl halide polymer.

Illustration (28)—α,β - diethylbutyric, α,α - dimethylbutyric, α-ethyl-β-methylbutyric, and α-methylpropionic having an average number of carbon atoms of 7.55 and an Average H. Number of 21.0 when used in fractional amounts of 0.8, 0.1, 0.04, and 0.5 respectively.

Other similar esters are conveniently prepared and employed as secondary plasticizers in the prescribed amounts. The average number of carbon atoms of any esterifying acid mixture having an average number of carbon atoms from 5 to 7, is increased to above 7 by increasing the amounts of carbon atoms in the acid mixture.

The esters of this invention may be used in conjunction with appropriate common plasticizers, such as dioctyl phthalate, dibutyl phthalate, di-n-decyl phthalate, other esters of polyols, and the like. They may also be employed, if desired, in combination with antioxidants such as, for example, phosphites, amines, phenols, and the like. The antioxidants are generally employed in amounts varying from about 0.1 to about 0.3% by weight of the material to be stabilized. Various pigments, colors, fillers, and polymer stabilizers may also be added to these compositions.

The polymers are compounded by means of conventional equipment, such as mills of the heated roll type, or internal mixers. The plasticizer and other compounding ingredients, such as fillers and stabilizers, are worked into the resin so that they are thoroughly dispersed therein by means of such equipment, and the resulting compositions are then molded, calendered, extruded, formed into articles of desired shape by conventional procedure, or applied on electrical conductors by extrusion over the wire conductors.

It has been discovered that the esters of this invention have excellent electrical properties allied with very desirable mechanical properties and stability to copper and to fungal attack. As illustration there are prepared samples of molded slabs of chlorine-containing polymers plasticized with a select number of representative samples of esters of this invention. All examples are given by way of illustration and are not to be construed as limiting this invention. All parts are by weight.

EXAMPLE 10

There are compounded on differential rolls 65 parts of polyvinyl chloride and 35 parts of dipentaerythritol hexa-α-ethylbutyrate. In this formulation there is incorporated 5 parts of stabilizer for the polyvinyl chloride such as Tribase E—a complex lead silicate-lead sulfate salt—15 parts of clay filler (No. 30 or 33 Burgess Clay) and a lubricant such as 0.3 part of Aristowax. The material is sheeted off and then molded into a standard 4 cavity ASTM mold to give specimens of 6" x 6" by approximately 0.075".

The various typical specimens are tested for volume resistivity; this has been shown to have excellent correlation with insulation resistance. Volume resistivity is expressed in % values; this being the values in ohm-cm. obtained for the plasticized compositions divided by the value obtained by the conventional plasticized compositions multiplied by 100. The procedures followed are fully described in "Rubber Age," April 1956, on pages 105–108 by C. E. Balmer and R. F. Conyne and in "Resin Review," Rohm & Haas Company, Resinous Products, vol. VI, No. 1, pages 3–9.

The electrical properties in terms of insulation resistance are tested by subjecting the specimens to a significant number of volume resistivity tests which comprises subjecting the samples to (a) a temperature of 25° C. and 50% relative humidity, (b) a temperature of 90° C. and 50% relative humidity, (c) a temperature of 60° C. after immersion for 20 hours in water heated to 60° C., and (d) a temperature of 75° C. after immersion for one day, one, four, and eight weeks at 75° C.

The electrical properties of the plasticizing esters of this invention are compared with those of specimens plasticized with diisodecylphthalate, di-n-decylphthalate, 2-ethylhexylphthalate and other electrical grade conventional plasticizers. Insulation resistance of the new compositions is found to be substantially superior to that of conventional compositions. Volume resistivity of the compositions plasticized with products of this invention are in the range of 200 to 1000% and sometimes 2000% superior to that of conventional compositions tested by the same methods. Further illustrations and electrical properties values are shown under the examples given above setting forth the preparation of the esters.

In Example 10 above there is substituted any other appropriate ester of this invention. For instance, there is employed dipentaerythritol hexa(α-methylpentanoate), dipentaerythritol tetra-α-ethylhexanoate diacetate, dipentaerythritol tri-α-methylbutyrate tri-α-ethylhexanoate, also such esters of dipentaerythritol as α,α-dimethyl-β-methylbutyrate, α-methylpentanoate n-hexanoate β-methylpentanoate, α-methylbutyrate α-ethyl - γ - methylpentanoate, α-ethyl - γ - methylpentanoate acetate, γ - methylbutyrate n - hexanoate, α - methylbutyrate cyclohexylacetate, β-methylpentanoate α - methylcyclohexylacetate, α-methylpentanoate phenylacetate, α - ethylphenylacetate α-ethylbutyrate α-methylpentanoate, myristate diisopropylacetate acetate impart superior electrical properties. Similar esters prepared from pentaerythritol and from the higher prescribed polypentaerythritols yield excellent products when incorporated in compositions used for electrical applications.

In Example 10 above, the polymer is replaced by a copolymer of vinyl chloride and vinyl acetate or of vinyl chloride and vinylidene chloride, the polyvinyl chloride being present in an amount of at least 80% on the basis of all polymeric material. Electrical properties of these compositions are tested in accordance with the procedures described above. Resistivity values are markedly above those of conventional compositions. Electrical insulators perform in a most satisfactory manner.

Amounts of these plasticizers are varied from about 5 to 50 parts, and preferably from about 20 to 40 parts, per 100 parts of polymer. Amounts of plasticizer, filler and other additives may be varied as desired depending on the application and use intended.

Plasticized compositions of particular value are those compounded with esters which are prepared from polyols containing 85 to 100% dipentaerythritol. With acid mixtures there may be present acetic acid in minor amounts, as not in excess of 0.1 mole per mole of acid mixture. Acids having an individual content of carbon atoms from 4 to 10 are particularly desirable. Also compositions plasticized with esters of mixtures of α-methylbutyric acid and of a limited amount of a straight-chain monocarboxylic acid containing 8 to 16 carbon atoms form a desirable group.

Microbiological resistance and fungus resistance of these compositions is tested in accordance with standard procedures. The method comprises subjecting, under controlled conditions, test specimens of vinyl halide polymers, plasticized with selected typical esters of this invention to a group of microorganisms known to attack plastic materials under conditions favoring growth of the fungi. Upon completion of the incubation period the samples are examined, rated, tested for stiffness, loss in weight and any other change in characteristics.

Vinyl halide polymers, such as polyvinyl chloride, plasticized with typical esters of this invention show a percent weight loss of less than 1% and generally less than 0.5%, while polyvinyl chloride plasticized with conventional materials, such as with a common dipentaerythritol mixed or simple ester, or with diisodecyl phthalate or with di-2-ethylhexyl phthalate, shows significantly higher losses of weight, commonly over 5%. The plasticized compositions of this invention consistently show no increase in stiffness but remain readily flexible and supple. Conventional materials show substantial increase in stiffness.

Hologen-containing polymers plasticized with typical esters of this invention, such as polyvinyl chloride plasticized with various amounts of from about 20 to about 50 parts of such esters as: dipentaerythritol hexa(α-ethylbutyrate), dipentaerythritol hexa(α-methylpentanoate), dipentaerythritol tetra-α-etylhexanoate diacetate, dipentaerythritol tri-α-methylbutyrate tri-α-ethylhexanoate and esters of dipentaerythritol such as esters of α,α-dimethylbutyric and α-ethylbutyric; α,α-diisopropylcaprylic, α-ethyl-α-methylbutyric, α,α-dimethylpropionic and acetic; butyric and cyclohexylacetic; dicyclopentylacetic, α-methylbutyric, and isobutyric; diphenylacetic, β-methylbutyric and acetic; benzoic, α-methylpentanoic and n-hexanoic; myristic diisopropylacetic and acetic, and the like, are fabricated into molded slabs, are clamped in contact with a copper foil, 0.004" in thickness and suspended in an atmosphere of high humidity at 60° C. Observations are periodically made for spew, green discoloration of spew and/or vinyl and copper staining. All specimens plasticized with the esters of this invention remain substantially unaltered; no green spew or discoloration appears on the sample. Conventionally plasticized compositions show bad to very pronounced green marks and discoloration. Esters of pentaerythritol and those of the specified polypentaerythritols containing various amounts of dipentaerythritol similarly show marked resistance to copper corrosion.

In further comparative performance tests polyvinyl chloride polymers are plasticized with conventional plasticizers highly regarded in industry such as diisodecyl phthalate, an electrical grade of di-2-ethylhexyl phthalate and a conventional mixed ester of dipentaerythritol and these compositions are compared with polyvinyl compositions plasticized with selected esters of this invention. Intensive tests are conducted on typical mechanical properties, such as Shore "A" and "C" Hardness, tensile strength, elongation, and permanence properties such as activated carbon volatility at 90° C., oil extraction, marring, and compatibility. The new plasticized compositions have very good mechanical and permanence properties allied with superior insulation resistance.

In comparative compatibility and permanence testing, compositions plasticized with typical esters of this invention and with typical conventional plasticizers are immersed for four weeks in water heated to 75° C. and then removed and rated for odor and spew. Whereas compositions of this invention evidence no objectionable odor or spew conventional compositions have a strong, very objectionable carboxylic acid odor and definite spew.

We claim:

1. A new composition of matter, an ester of the formula

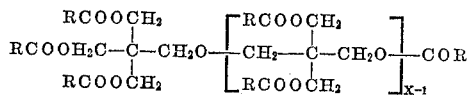

wherein X equals 1 to 14 with an average value not exceeding 3 and RCO, the acyl group, is selected from the group consisting of alkanoyl, aralkanoyl, aroyl, and alkaroyl, the ester being further defined in that, when its acid moiety is a single acyl group, the acyl group has a 5 to 7 carbon atom content and an H. Number of 8 to 16.5 and that, when the acid moiety of said ester is a mixture of acyl groups, the mixed acyl groups have an average carbon atom content of 5 to 7 and an average H. Number of 8 to 16.5, each acyl group of said mixed acyl groups having a carbon atom content of 2 to 18, and said ester being further defined by having a melting point not exceeding about 35° C.

2. The ester of claim 1 in which, in the formula for the polyol, X equals 1 to 3.

3. The ester of claim 1 which has a hydroxyl number from about 1.0 to zero and an acid number from about 0.5 to about zero.

4. A new composition of matter, an ester of the formula

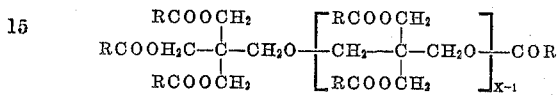

wherein X equals 1 to 14 with an average value not exceeding 3, and RCO is an alkanoyl group which contains 5 to 7 carbon atoms and has an H. Number of 8 to 16.5, said ester being further defined by having a melting point not exceeding about 35° C.

5. The ester of claim 4, in which the alkanoyl group contains 5 to 7 carbon atoms and has an H. Number of 8 to 13.

6. Dipentaerythritol hexa(α-methylpentanoate).

7. Dipentaerythritol hexa(α-ethylbutyrate).

8. A new composition of matter, an ester of the formula

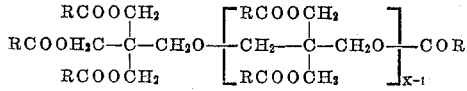

wherein X equals 1 to 14 with an average value not exceeding 3, and RCO, the acyl group, is selected from the group consisting of alkanoyl, aralkanoyl, aroyl, and alkaroyl, the ester being further defined in that the acid moiety of said ester is a mixture of acyl groups, the mixed acyl groups have an average carbon atom content of 5 to 7 and an average H. Number of 8 to 16.5, each acyl group of said mixed acyl groups having a carbon atom content of 2 to 18, and said ester being further defined by having a melting point not exceeding about 35° C.

9. The ester of claim 8 in which the mixed acyl groups have an average carbon atom content of 5 to 7 and an average H. Number of 8 to 13.

10. The ester of claim 9 in which the average carbon atom content of the mixed acyl groups is 6.

11. The ester of claim 8 in which the alkanoyl group is α-methylpentanoyl.

12. Dipentaerythritol tri-α-methylbutyrate tri-α-ethylhexanoate.

13. A plasticized resinous composition comprising a polymer selected from the group consisting of homopolymers of vinyl chloride and copolymers of vinyl chloride with an ethylenically unsaturated monomer copolymerizable therewith, said copolymer containing at least about 80% by weight of vinyl chloride combined therewith and said plasticized resinous composition having incorporated therein about 5 to about 60% by weight of the plasticizing ester defined in claim 1.

14. The plasticized resinous composition of claim 13 which is plasticized with the ester of claim 4.

15. The plasticized resinous composition of claim 13 which is plasticized with the ester of claim 8.

16. The plasticized resinous composition of claim 13 in which the polymer is a homopolymer of vinyl chloride.

17. The plasticized resinous composition of claim 13 in which the polymer is a copolymer of vinyl chloride with an ethylenically unsaturated monomer copolymerizable therewith.

18. The plasticized resinous composition of claim 17 in which the polymer is a copolymer of vinyl chloride and vinyl acetate.

19. The plasticized resinous composition of claim 17 in which the polymer is a copolymer of vinyl chloride and vinylidene chloride.

20. The plasticized resinous composition of claim 17 in which the polymer is a copolymer of vinyl chloride and vinyl propionate.

References Cited in the file of this patent

UNITED STATES PATENTS

| | | |
|---|---|---|
| 2,381,247 | Barth | Aug. 7, 1945 |
| 2,807,638 | Morris | Sept. 24, 1957 |

OTHER REFERENCES

Buttrey: "Plasticizers," Cleaver-Hume Press Ltd., London, 1950, pages 119–120.